United States Patent
Ronald et al.

(10) Patent No.: US 11,904,396 B2
(45) Date of Patent: Feb. 20, 2024

(54) METHOD AND APPARATUS FOR LOADING AND POSITIONING A WORKPIECE ON A GEAR MANUFACTURING MACHINE

(71) Applicant: THE GLEASON WORKS, Rochester, NY (US)

(72) Inventors: Craig R. Ronald, Fairport, NY (US); Uwe Gaiser, Ostfildern (DE); Daniel J. Schwab, Fairport, NY (US); Matthew J. McNall, Pavilion, NY (US); Bryan L. Patterson, Rochester, NY (US); Kevin H. Blakely, Rochester, NY (US); William D. McGlasson, Caledonia, NY (US)

(73) Assignee: THE GLEASON WORKS, Rochester, NY (US)

( * ) Notice: Subject to any disclaimer, the term of this patent is extended or adjusted under 35 U.S.C. 154(b) by 409 days.

(21) Appl. No.: 17/273,096

(22) PCT Filed: Sep. 5, 2019

(86) PCT No.: PCT/US2019/049631
§ 371 (c)(1),
(2) Date: Mar. 3, 2021

(87) PCT Pub. No.: WO2020/051266
PCT Pub. Date: Mar. 12, 2020

(65) Prior Publication Data
US 2021/0308780 A1 Oct. 7, 2021

Related U.S. Application Data

(60) Provisional application No. 62/728,233, filed on Sep. 7, 2018.

(51) Int. Cl.
*B23F 23/04* (2006.01)
*B23F 23/12* (2006.01)
(Continued)

(52) U.S. Cl.
CPC .............. *B23F 23/04* (2013.01); *B23F 19/05* (2013.01); *B23F 19/12* (2013.01); *B23F 23/1218* (2013.01); *B23F 23/1293* (2013.01)

(58) Field of Classification Search
CPC .... B23F 1/00; B23F 1/02; B23F 1/023; B23F 3/00; B23F 5/00; B23F 5/02; B23F 5/04;
(Continued)

(56) References Cited

U.S. PATENT DOCUMENTS

| 3,368,455 A | 2/1968 | Ellwanger |
| 4,058,999 A | 11/1977 | Gabriele |

(Continued)

FOREIGN PATENT DOCUMENTS

| EP | 1146983 B1 | 3/2002 |
| EP | 2480366 B1 | 11/2013 |

OTHER PUBLICATIONS

International Search Report and Written Opinion for PCT/US2019/049631, ISA/EPO, dated Dec. 16, 2019, 12 pgs.

*Primary Examiner* — Lee D Wilson
*Assistant Examiner* — Alberto Saenz
(74) *Attorney, Agent, or Firm* — Robert L. McDowell

(57) ABSTRACT

A method wherein a first workpiece (2, 40) is loaded to a spindle (30) of a workpiece processing machine with the first toothed workpiece having a predetermined design and being in a predetermined rotational load position. The first toothed workpiece is stock-divided and a machining position is determined based on the stock-dividing. The first toothed workpiece is rotationally adjusted to the machining position. The teeth (3, 42) of the first toothed workpiece are then machined and the first workpiece is removed from the spindle. A second toothed workpiece is loaded to the spindle of the workpiece processing machine. The second toothed workpiece has the same predetermined design and is in the (Continued)

same predetermined rotational load position as the first toothed workpiece. The second toothed workpiece is rotationally adjusted from the predetermined rotational load position to the machining position by the same adjustment amount as the first toothed workpiece. The second toothed workpiece is machined and then removed from the machine spindle. The process as performed for the second toothed workpiece can be repeated for subsequent workpieces having the same design and being in the same rotational load position as the first and second workpieces. For the second and subsequent toothed workpieces, the step of determining the rotary position of the teeth is not carried out.

15 Claims, 18 Drawing Sheets

(51) Int. Cl.
  *B23F 19/05* (2006.01)
  *B23F 19/12* (2006.01)
(58) Field of Classification Search
  CPC .... B23F 5/06; B23F 5/065; B23F 5/08; B23F 5/085; B23F 5/10; B23F 7/00; B23F 9/00; B23F 9/02; B23F 9/025; B23F 11/00; B23F 13/00; B23F 13/06; B23F 13/04; B23F 13/006; B23F 13/08; B23F 19/00; B23F 19/005; B23F 19/02; B23F 19/025; B23F 19/04; B23F 19/045; B23F 19/12; B23F 19/125; B23F 21/02; B23F 21/026; B24B 53/075; B24B 53/085
  USPC .............................................. 451/47; 409/51
  See application file for complete search history.

(56) References Cited

U.S. PATENT DOCUMENTS

| 4,473,146 | A | | 9/1984 | Oree, Jr. | |
| 5,136,522 | A | * | 8/1992 | Loehrke | B23F 23/12 |
| | | | | | 451/21 |
| 6,712,566 | B2 | | 3/2004 | Stadtfeld et al. | |
| 7,188,420 | B2 | * | 3/2007 | Fisher | B23F 9/10 |
| | | | | | 82/170 |
| 8,137,160 | B2 | * | 3/2012 | Kurashiki | B23F 23/1218 |
| | | | | | 451/6 |

* cited by examiner

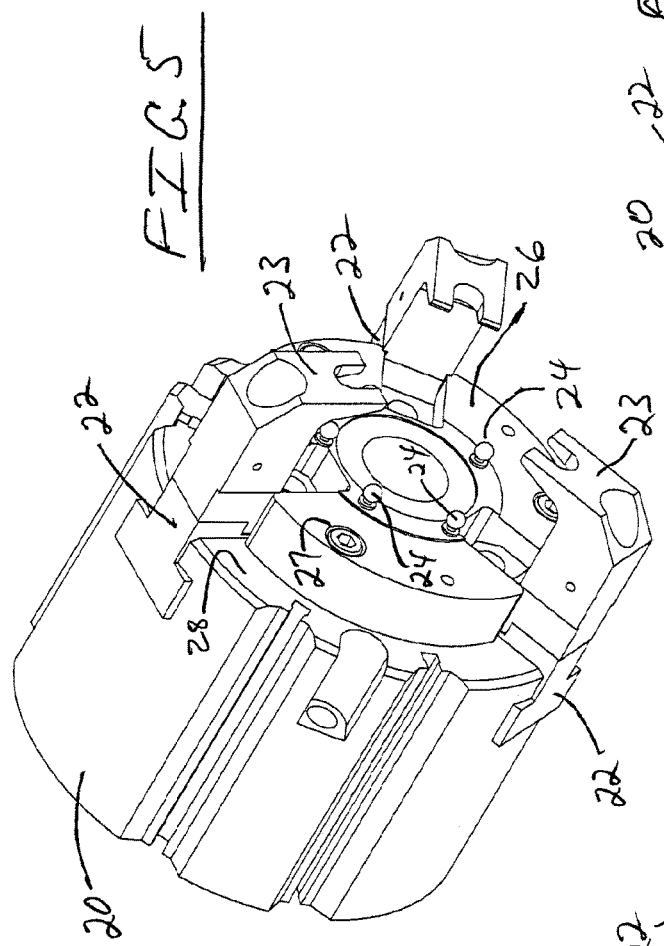
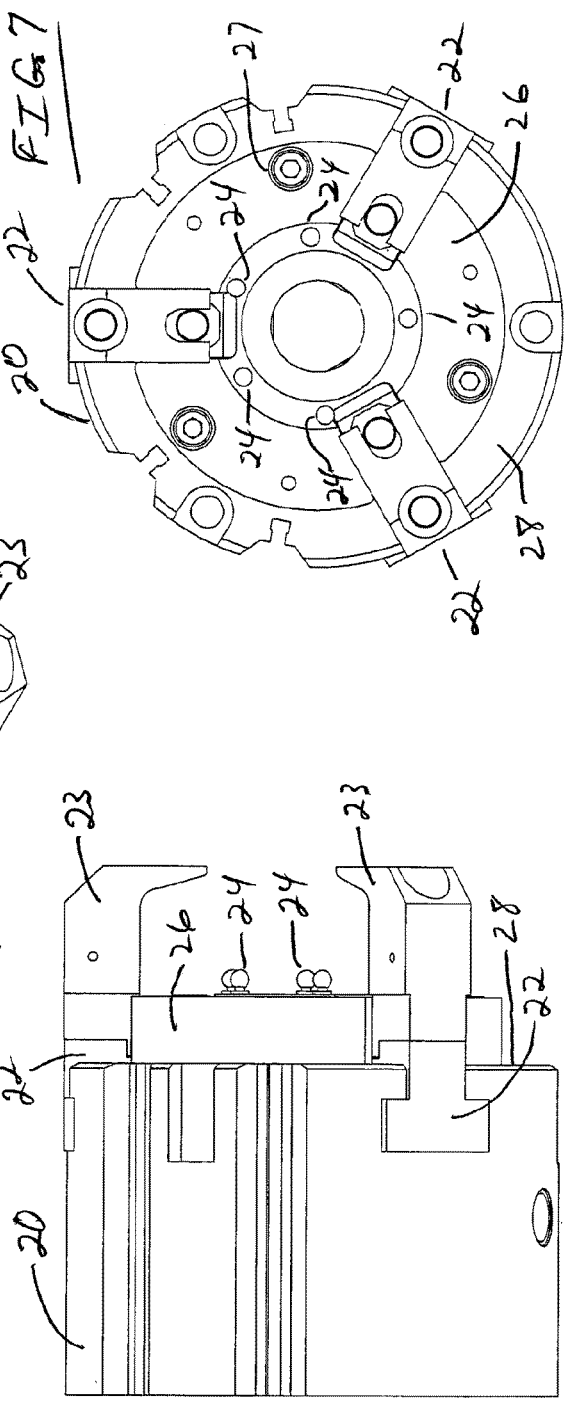
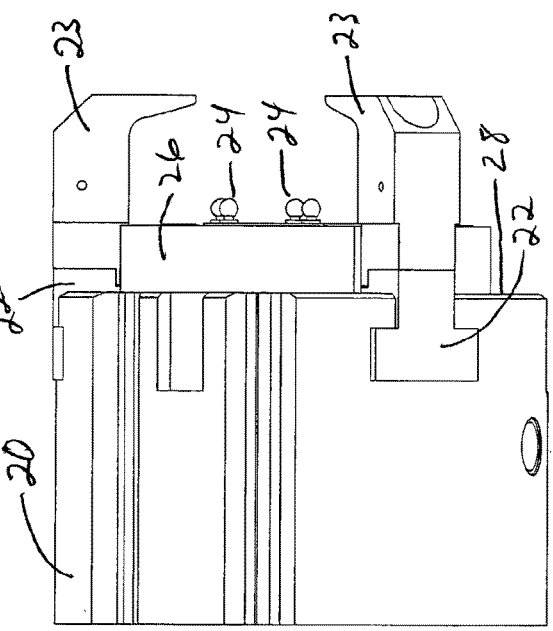

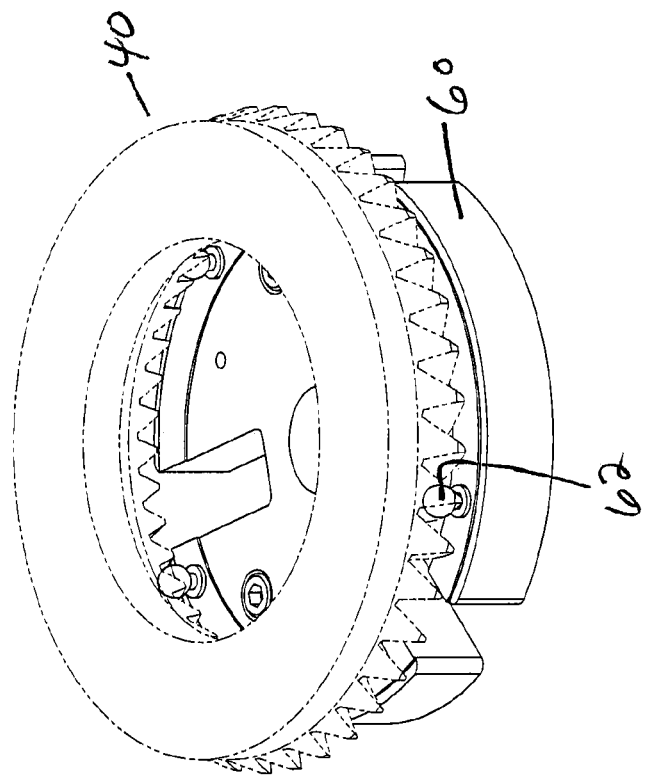
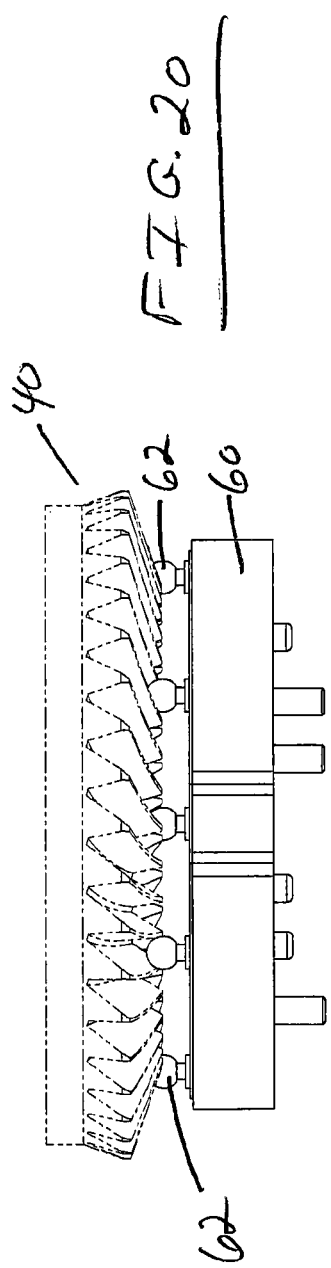

METHOD AND APPARATUS FOR LOADING AND POSITIONING A WORKPIECE ON A GEAR MANUFACTURING MACHINE

FIELD OF THE INVENTION

The invention is directed to gear manufacturing machines and processes and in particular to loading a workpiece to a gear manufacturing machine followed by an on-machine stock dividing step.

BACKGROUND OF THE INVENTION

In the production of toothed articles, particularly gear-shaped workpieces such as bevel gears (e.g. pinions and ring gears) and cylindrical gears (e.g. spur gears and helical gears), one or more finishing operations usually follow the initial rough forming (e.g. cutting, forging, casting, etc.) of the teeth. Such finishing operations include, but are not limited to, grinding, honing, polishing, shaving, and finish cutting (e.g. hard skiving, power skiving, etc.).

Prior to any finishing operation, a gear-shaped workpiece must be appropriately "stock-divided" (also known as centering, aligning or phasing) which means the teeth of the partially finished gear (e.g. rough formed gear) must be positioned properly relative to a tool prior to the initiation of the finishing operation. Stock-dividing ensures that the tool will enter a tooth slot (i.e. the space between adjacent teeth) in a manner such that no tool-workpiece collisions or damage occurs and the flank surfaces of the workpiece teeth will be properly contacted and shaped by the tool.

In the grinding of bevel gears, for example, after a workpiece (e.g. pinion or ring gear) is loaded onto the workpiece spindle of a computer-controlled (e.g. CNC) gear grinding machine, such as the machine disclosed in U.S. Pat. No. 6,712,566 for example, a stock-dividing operation must be performed for each workpiece prior to the start of grinding. A typical stock-dividing process may comprise contacting the adjacent tooth surfaces of a plurality of spaced apart tooth slots (e.g. three or more) in order to locate the average centerline position of the slots between the teeth and then rotationally (i.e. angularly) adjusting the workpiece so as to properly position the teeth, and tooth slots, relative to the machining position of the grinding wheel so that the grinding wheel can enter each tooth slot without incident. The stock-dividing process, per se, is well known to the skilled artisan and a further discussion of the details thereof is not necessary for an understanding of the present invention.

While it is essential that a toothed workpiece be properly positioned relative to a tool such as a grinding wheel, the process of stock-dividing can be time consuming. Typically, stock-dividing can consume 15-20 seconds or more which means the machine (e.g. grinding machine) is effectively idle since no actual machining is occurring. There remains a need to reduce or eliminate the unproductive time attributable to stock-dividing. As a result, machining cycle times would be shortened and the number of machined parts produced for a given period of time would increase.

SUMMARY OF THE INVENTION

The present invention is directed to a method of machining rotatable toothed workpieces, such as gears, comprising a plurality of teeth and a plurality of tooth slots.

The method comprises loading a first workpiece to a spindle of a workpiece processing machine with the first toothed workpiece having a predetermined design and being in a predetermined rotational load position. The first toothed workpiece is stock-divided and a machining position is determined based on the stock-dividing. The first toothed workpiece is rotationally adjusted to the machining position. The teeth of the first toothed workpiece are then machined and the first workpiece is removed from the spindle.

A second toothed workpiece is loaded to the spindle of the workpiece processing machine. The second toothed workpiece has the same predetermined design and is in the same predetermined rotational load position as the first toothed workpiece. The second toothed workpiece is rotationally adjusted from the predetermined rotational load position to the machining position by the same adjustment amount as the first toothed workpiece. The second toothed workpiece is machined and then removed from the machine spindle.

The process as performed for the second toothed workpiece can be repeated for subsequent workpieces having the same design and being in the same rotational load position as the first and second workpieces. For the second and subsequent toothed workpieces, the step of determining the rotary position of the teeth is not carried out.

BRIEF DESCRIPTION OF THE DRAWINGS

FIG. 5 illustrates an isometric view of a gripping device having an adapter plate with a plurality of pin and ball elements.

FIG. 6 shows a side view of the griping device of FIG. 5.

FIG. 7 shows an end view of the gripping device of FIG. 5.

FIG. 19 illustrates an isometric view of a bevel ring gear engaged with the contacting balls of the adapter plate of a gripping device.

FIG. 20 illustrates a side view of a bevel ring gear engaged with the contacting balls of the adapter plate of a gripping device.

DETAILED DESCRIPTION OF THE PREFERRED EMBODIMENT

Figure 1:
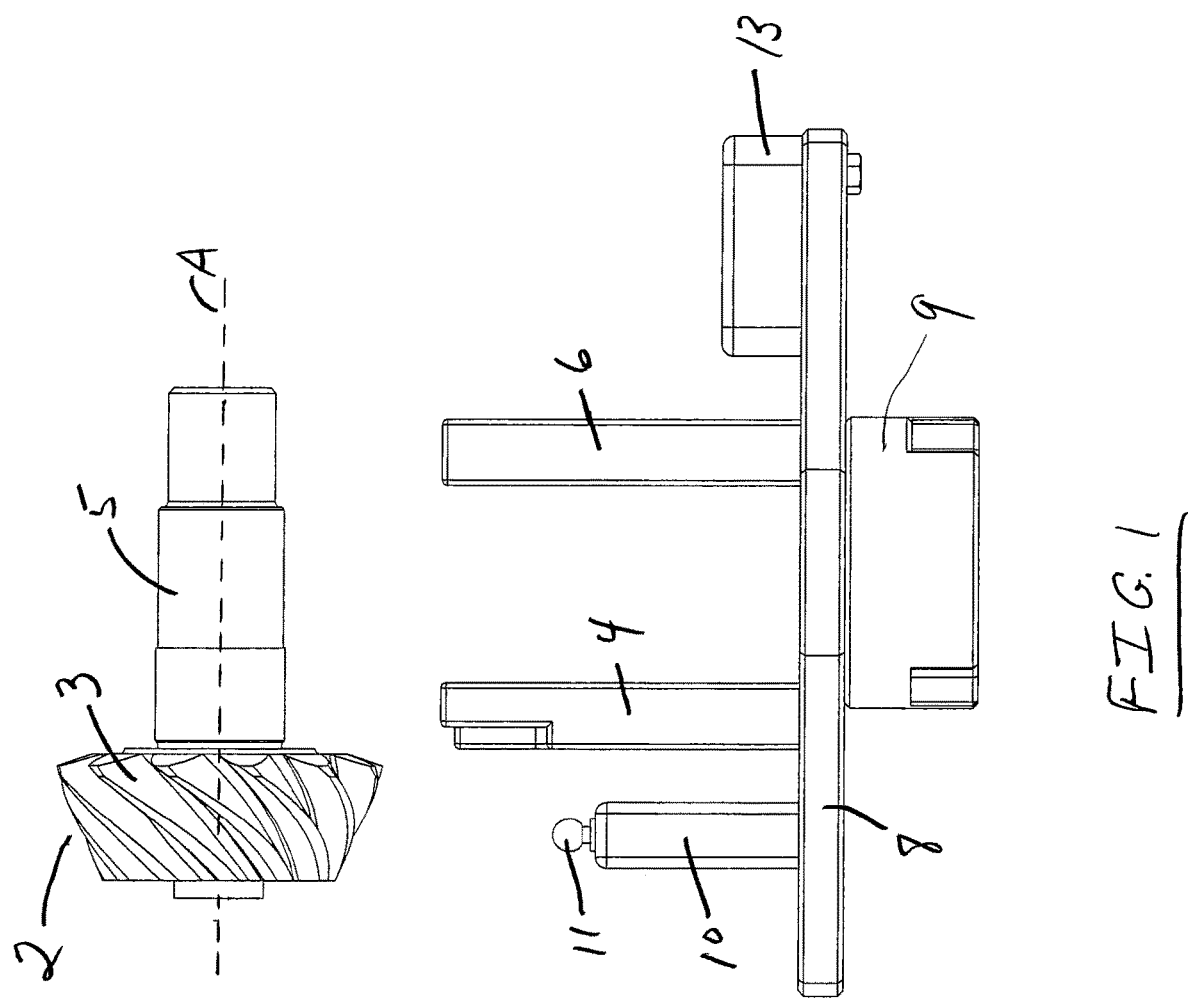
FIG. 1 illustrates a side view of a bevel pinion positioned above a pallet of a conveying device.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers. For a better understanding of the invention and ease of viewing, doors and any internal or external guarding have been omitted from the drawings.

The use of "including", "having" and "comprising" and variations thereof herein is meant to encompass the items listed thereafter and equivalents thereof as well as additional items. The use of letters to identify elements of a method or process is simply for identification and is not meant to indicate that the elements should be performed in a particular order.

Although references may be made below to directions such as upper, lower, upward, downward, rearward, bottom, top, front, rear, etc., in describing the drawings, these references are made relative to the drawings (as normally viewed) for convenience. These directions are not intended to be taken literally or limit the present invention in any form.

The invention provides a method and apparatus whereby the need to stock-divide each toothed workpiece loaded onto a processing machine is eliminated.

FIGS. 1-4 illustrate a preferred embodiment wherein a workpiece 2, for example a bevel pinion having a plurality of teeth 3 and a shaft 5, is located on supports 4, 6 of a pallet 8. Pallet 8 may be a stand-alone fixture or may be located along with other such pallets on a conveyor mechanism for transporting workpieces to and from a machine having an associated loading/unloading apparatus. In the illustrated examples, pallet 8 is shown positioned on pallet guides 9 that are components of a workpiece conveyor system (not shown). Pallet 8, or a plurality thereof, may also reside within a flexible automation cell (not shown) such as, for example, the AR Series of automation and material handling cells commercially available from The Gleason Works, Rochester, New York. The flexible automation cell, with or without conveyor, is preferably located adjacent to a processing machine such as a grinding machine for gears, particularly bevel gears. The flexible automation cell may include stations to provide one or more features such as, for example, part washing, part spin-off, deburring, inspection, part marking, roll testing and 3D-measurement along with the appropriate means to transfer workpieces from one station to another as well as to and from the processing machine (e.g. robot, gantry loader, etc.).

Figure 2:
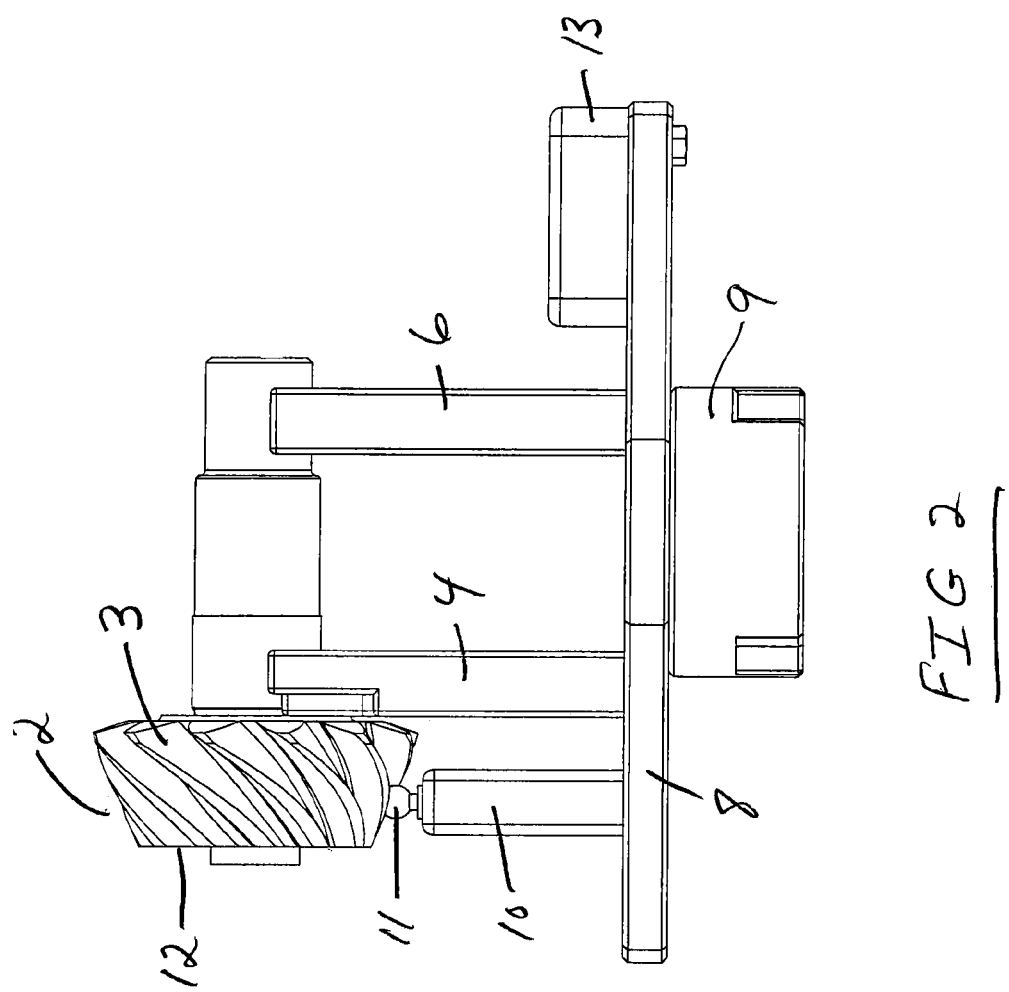
FIG. 2 illustrates a side view of a bevel pinion positioned on a pallet of a conveying device.
Figure 3:
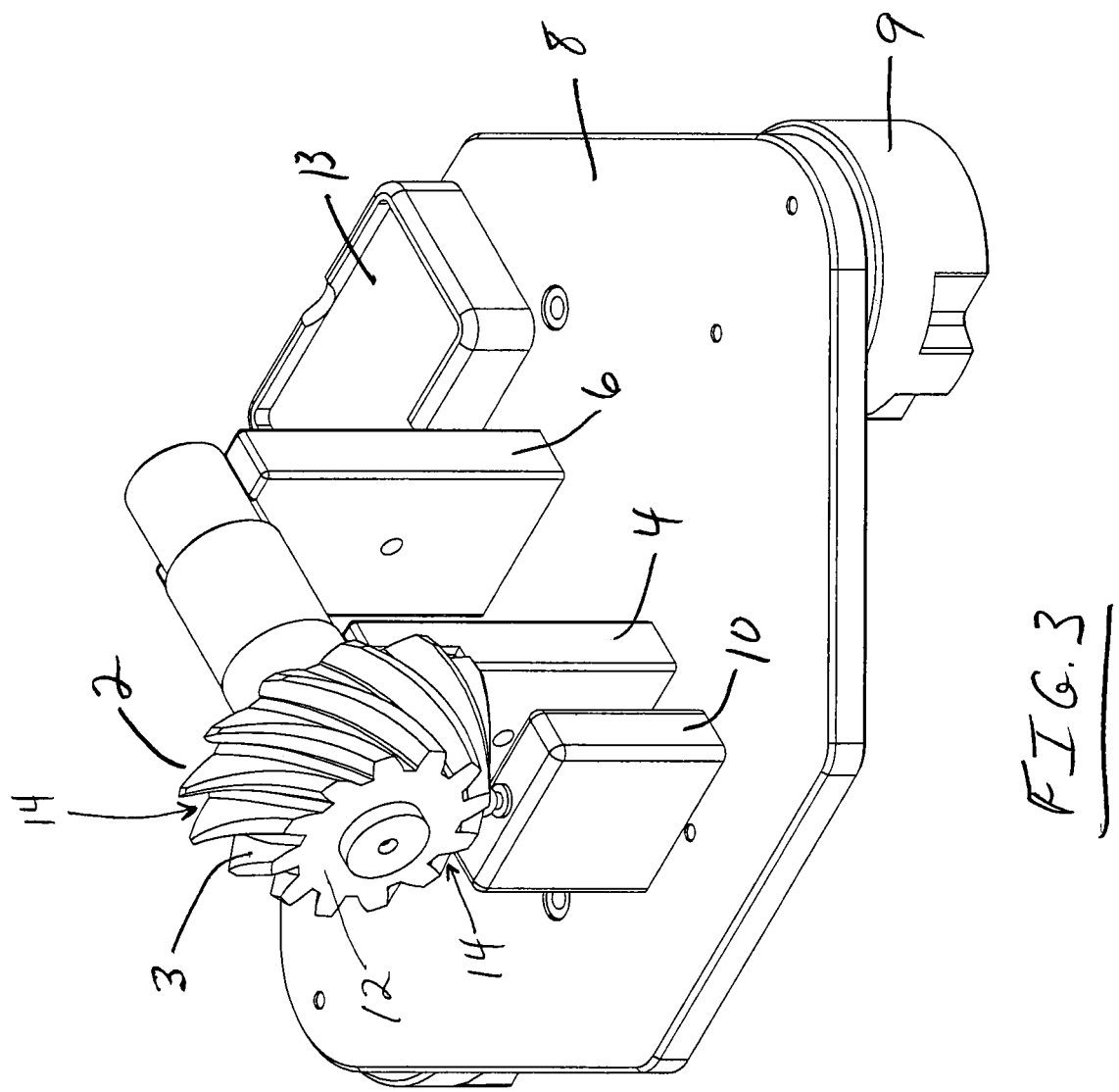
FIG. 3 shows an isometric view of a bevel pinion positioned on a pallet of a conveying device.
Figure 4:
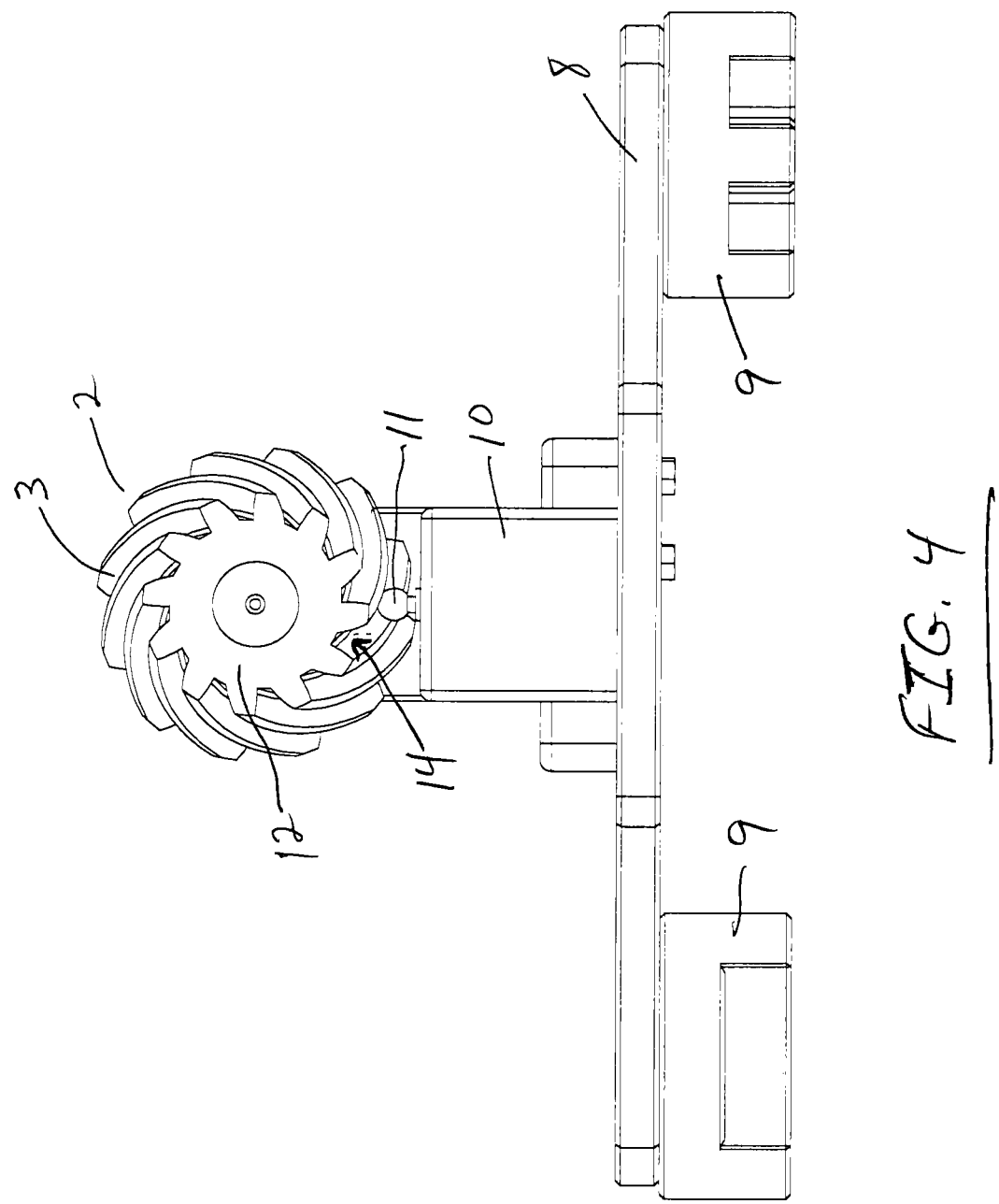
FIG. 4 shows a front view of a bevel pinion positioned on a pallet of a conveying device.

Pallet 8 further includes a locating element 10 comprising a locating pin and ball arrangement which, upon placement of the workpiece 2 on the pallet 8, the locating ball 11 is of a suitable diameter so as to be insertable into a tooth slot 14 of a workpiece (FIG. 4) and into contact with adjacent tooth flanks thereby positioning the workpiece in a fixed rotational orientation. Workpiece 2 may be placed on pallet 8 manually or via a loading mechanism such as a robot. Preferably, ball 11 contacts a tooth slot 14 at a location inward from the front face 12 of the workpiece (FIG. 2). The ball 11 of locating element 10 is preferably made from a hard material such as hardened steel or carbide. If necessary, a counterweight 13 may be included on pallet 8 in those instances where the weight of a workpiece is not evenly distributed, such as bevel pinion 2 having the majority of its weight at one end of the shaft 5.

Depending on the particular design of a workpiece such as bevel pinion 2, the location of the tooth slots can be determined and, therefore, with the fixed position of the workpiece 2 on locating element 10, the position of each tooth slot 14 may also be determined.

FIGS. 5-8 show a gripping mechanism for gripping a workpiece residing on pallet 8 and delivering the workpiece to a spindle of a workpiece processing machine. Preferably, the gripping mechanism comprises a chuck 20 having a plurality of jaws 22 (e.g. three or four), removable gripper fingers 23 appropriately shaped depending on the configuration of a workpiece, and a plurality of locating elements preferably comprising pins 21 and contacting ball elements 24. The pins and ball elements 24 are arranged spaced apart on an adapter plate 26 which is removably attached to the front face 28 of chuck 20 such as by bolts or screws 27. The pin and ball elements 24 are arranged and spaced on adapter plate 26 in a manner so as to coincide with the location of tooth slots 14 on the particular workpiece 2 positioned on pallet 8. Pins 21 and ball elements 24 are preferably made from a hard material such as hardened steel or carbide. Preferably, pin 21 and ball element 24 comprise a one-piece element that is releasably attached to adapter plate 26. However, pin 21 and ball element 24 may be separate elements that are releasably attached to one another and may be individually replaced or exchanged with respect to one another.

As mentioned, workpiece 2 is fixed in a known (i.e. capable of being determined) rotational position on pallet 8 and the location of tooth slots 14 are, therefore, also known (i.e. capable of being determined) since the design and geometry of the particular workpiece would be known to the gear designer, engineer and/or manufacturer. Based on the workpiece design, the pin and ball elements 24 are appropriately sized (i.e. diameter) and arranged and spaced about the adapter plate 26. Upon gripping the workpiece 2 by the jaws 22 of chuck 20, the pin and ball elements 24 coincide with certain tooth slots 14 and are brought into contact with the respective tooth flank surface and/or tooth edge near to the front face 12 of the workpiece for each contacted tooth slot 14 thereby resulting in a gripped workpiece that retains the same orientation when removed from pallet 8 as the orientation which existed on the pallet 8.

Figure 9:
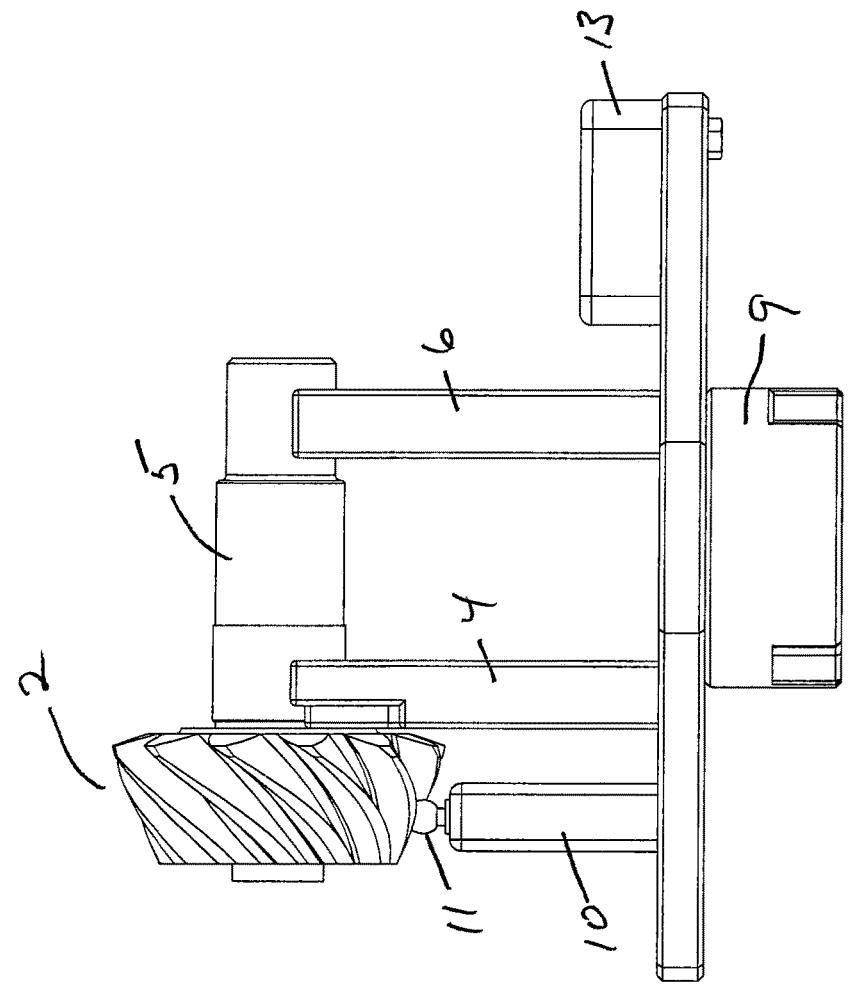
FIG. 9 illustrates a side view of a bevel pinion positioned on a pallet of a conveying device and in alignment for engagement by the gripping device of FIG. 8.
Figure 8:
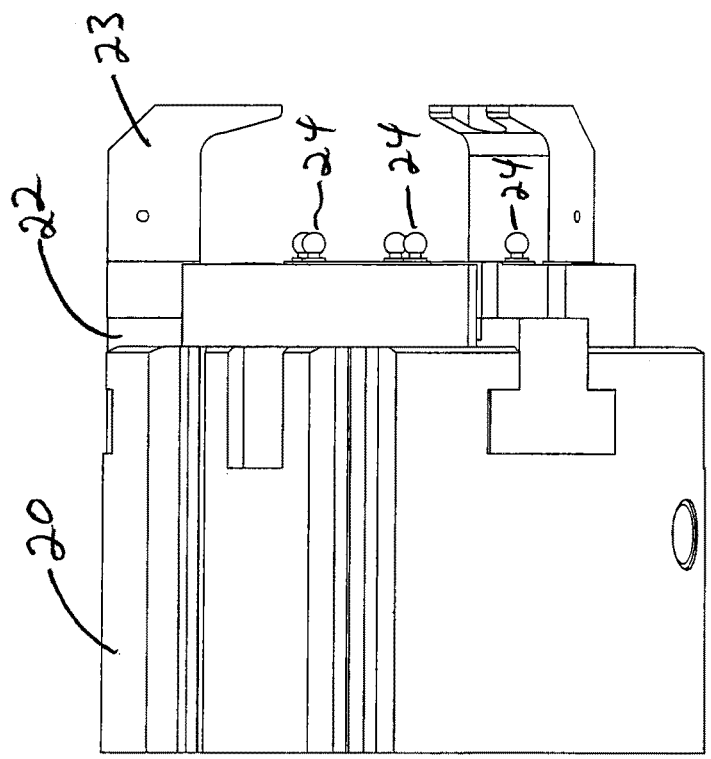
FIG. 8 shows another side view of the gripping device of FIG. 5 with a gripping finger removed to enhance clarity.
Figure 10:
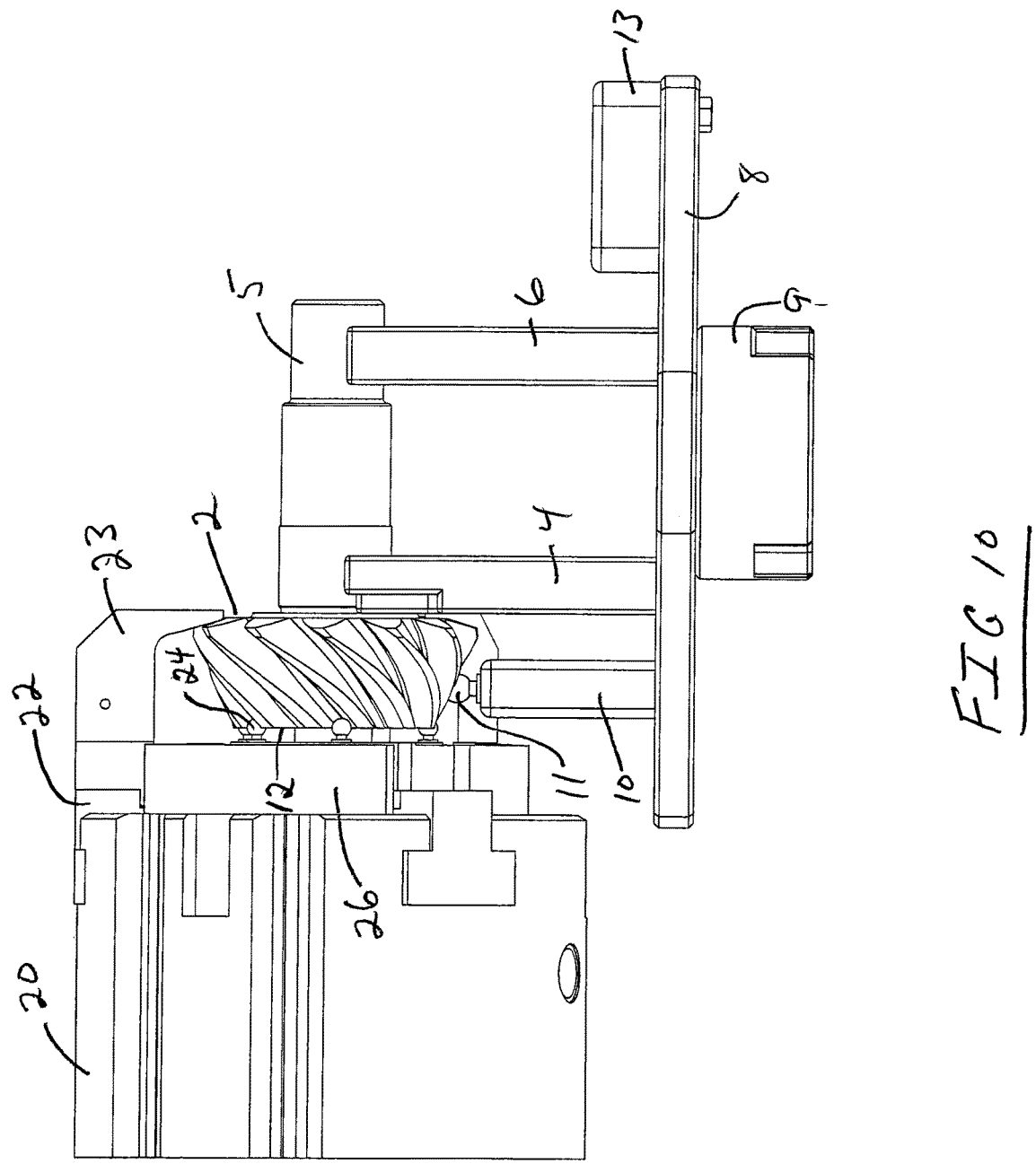
FIG. 10 shows a side view of the gripping device of FIG. 8 engaged with the bevel pinion positioned on a pallet of a conveying device of FIG. 9.

FIGS. 8-10 illustrate a chuck 20 aligned with a workpiece 2 prior to gripping. FIGS. 8 and 10 are shown with a gripping finger removed only for the purpose of providing a less obstructed view. It should be understood that one or both of the chuck 20 and pallet 8 may need to be moved in one or more directions relative to one another so as to appropriately align the chuck 20 and workpiece 2 for gripping. The appropriate relative movement may be effected by means such as, for example, a robot or along or about one or more machine axes of motion driven by, for example, servo motors or linear motors. FIG. 10 shows the chuck 20 engaged with and gripping workpiece 2 prior to removing the workpiece 2 from pallet 8. It should be noted that the location of contact between the ball 11 and the respective tooth slot 14 is preferably far enough away from the front face 12 of the workpiece so as to not interfere with a ball 24 that may be located in the same tooth slot as ball 11. See FIG. 10.

Figure 12:
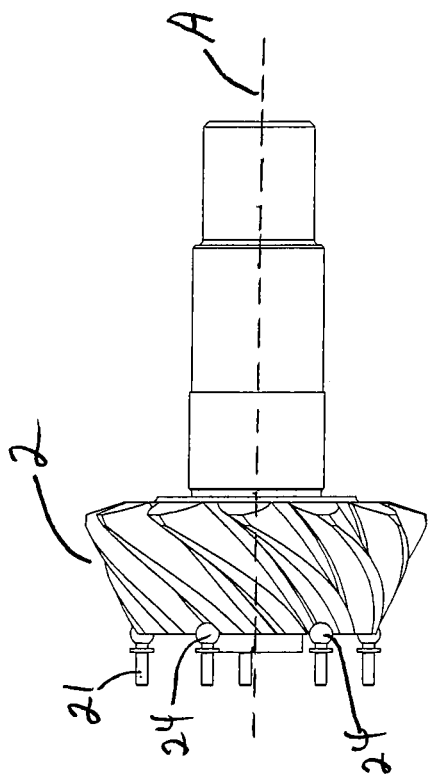
FIG. 12 is a side view of a bevel pinion showing the arrangement of contacting ball elements of a gripping device.
Figure 11:
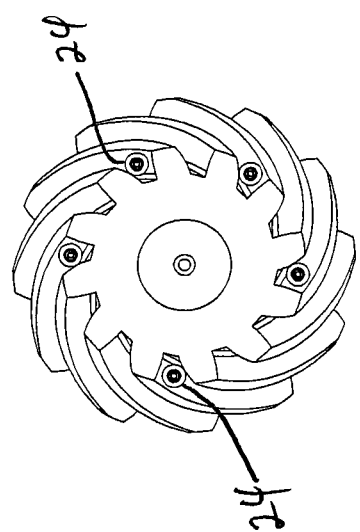
FIG. 11 is a front view of a bevel pinion showing the arrangement of contacting ball elements of a gripping device.
Figure 13:
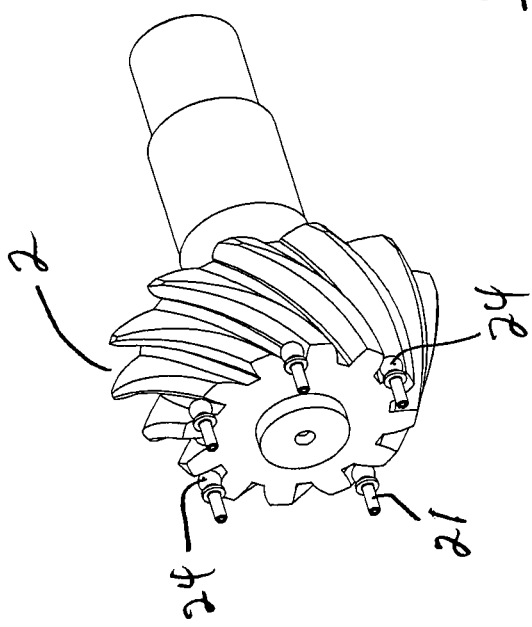
FIG. 13 is an isometric view of a bevel pinion showing the arrangement of contacting ball elements of a gripping device.

Preferably, chuck adapter plate 26 includes at least three, more preferably five or more, pin and ball elements 24 (five are shown in FIGS. 5-7). It is also preferred that the pin and ball elements 24 are spaced and positioned whereby during gripping they enter tooth slots 14 spaced about the workpiece (see FIGS. 11-13) in an effort to more evenly distribute the contact between the pin and ball elements 24 and workpiece 2. Although the pin and ball elements 24 are shown as being generally aligned with workpiece axis of rotation A (FIG. 12), the invention is not limited thereto. Pin and ball elements 24 may be oriented as desired based on the particular workpiece and/or gripping mechanism design.

Figure 14:
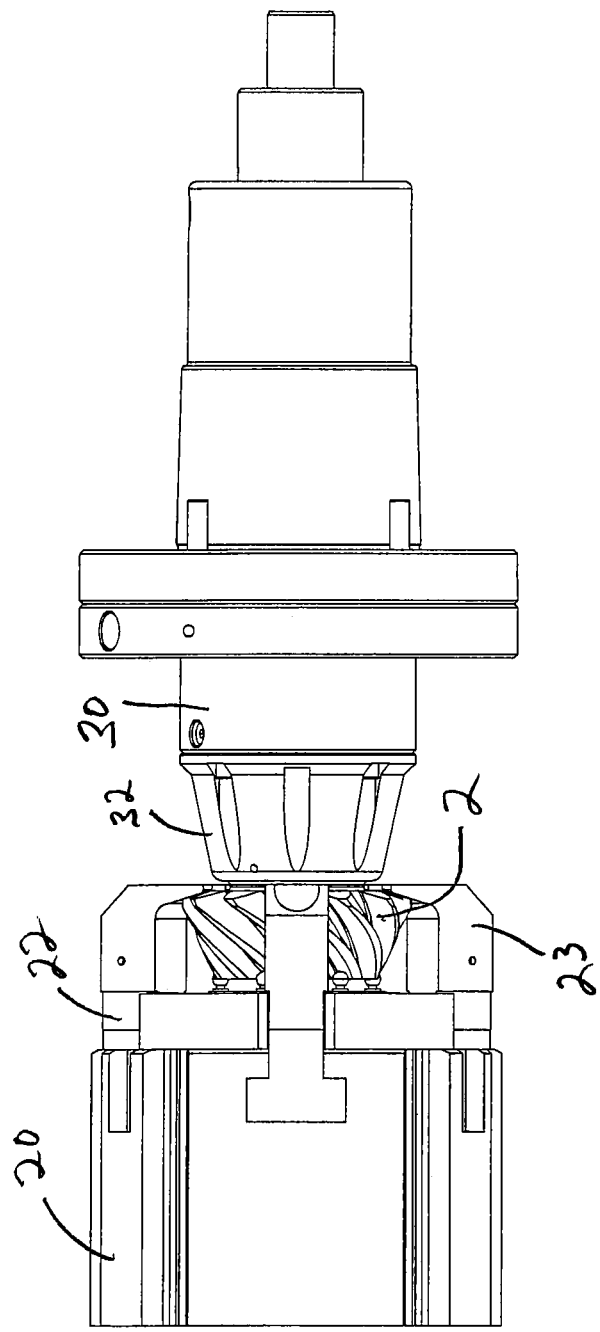
FIG. 14 illustrates a side view of a bevel pinion gripped by a gripping device and inserted into a spindle of a processing machine.
Figure 15:
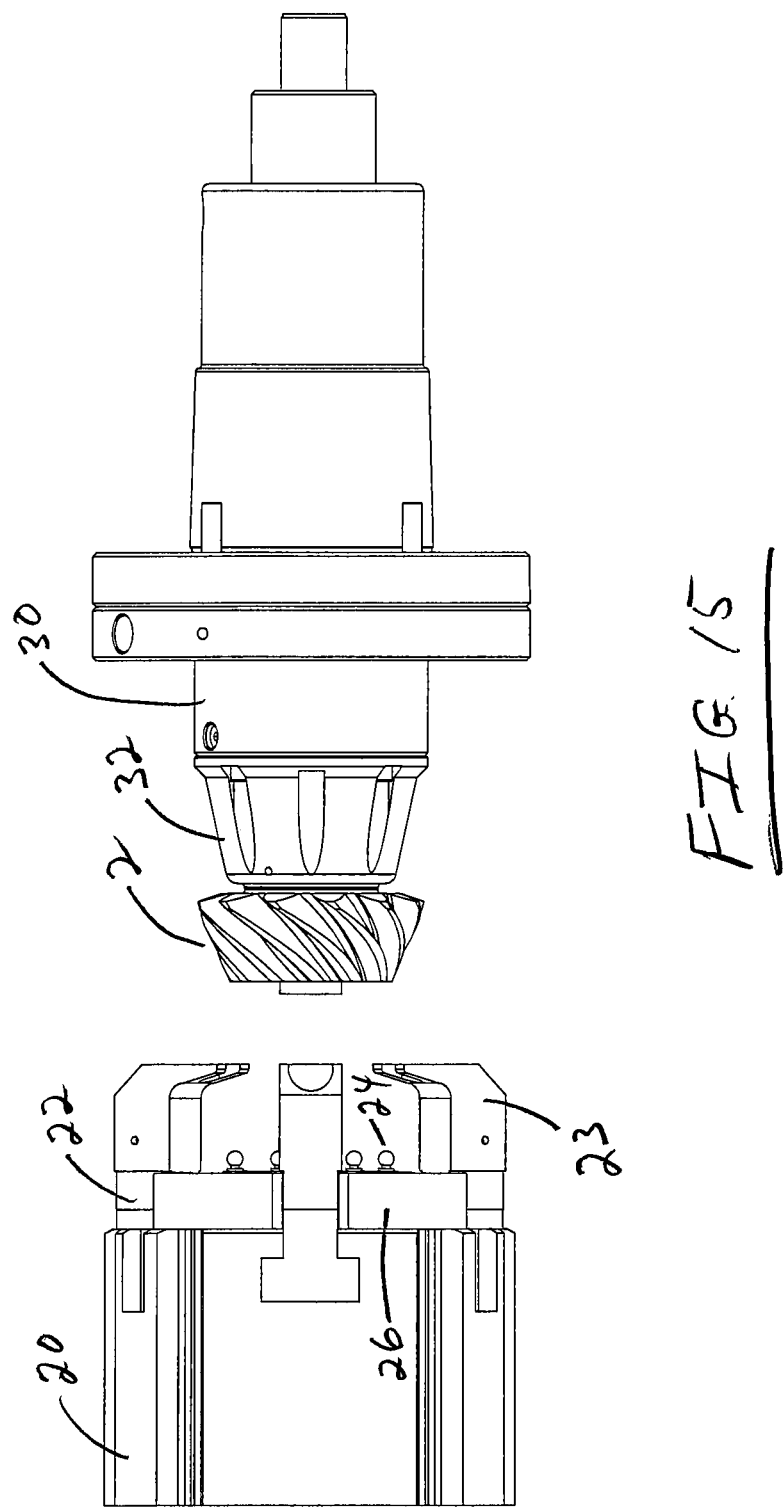
FIG. 15 shows the elements of FIG. 14 with the gripping device being disengaged from the bevel pinion.

Once a workpiece 2 has been gripped by chuck 22, it is removed from pallet 8 and transferred to the spindle of a workpiece processing machine such as a bevel gear grinding machine. FIG. 14 shows a gripped workpiece 2 loaded into the spindle 30 of a processing machine (e.g. grinding machine, not shown). Spindle 30 includes suitable work holding equipment 32 as would be understood by the skilled artisan and a further explanation thereof is not necessary. FIG. 15 shows chuck 20 disengaged from workpiece 2 which is secured in spindle 30 for further processing such as by grinding.

The transfer of workpiece 2 from the pallet 8 to the machine spindle 30 occurs with no discernible angular movement (i.e. rotational movement) of the workpiece whereby the angular (i.e. rotational) position of the teeth of the workpiece as gripped by chuck 20 is the same angular position that is delivered to the spindle 30. Since the first workpiece and all subsequent workpieces of the same design are initially oriented by ball 11 prior to gripping, the same workpiece orientation will be consistently presented to chuck 20. If desired, a sensor may be included on a processing machine so as to verify the position of a gripping mechanism is the same each time a workpiece is delivered and loaded to the machine spindle.

Thus it can be seen that for all workpieces of the same design, each workpiece will be presented to and loaded to the spindle of a processing machine in the same angular orientation. Stated another way, the teeth, and hence, the tooth slots, of each workpiece delivered to and secured by the spindle of a processing machine will be in the same angular position.

By having each workpiece of the same design loaded onto a processing machine in the same angular orientation, the necessity of stock-dividing each workpiece prior to machining is no longer necessary. After the first workpiece is loaded and stock-divided, and the angular adjustment, if any, is determined by the stock-dividing process, the second and subsequent workpieces of the same design can be loaded and angularly adjusted by the same amount as determined by the first workpiece (i.e. initial) stock-dividing operation without the need to conduct stock-dividing for that particular part. With the elimination of stock-dividing, the productivity of the machining process (e.g. grinding) may improve by an amount up to 25 percent given the time savings due to the elimination of stock-dividing.

It should be further noted that subsequent to machining, if it is desired to return a workpiece 2 to the pallet 8, configured as shown in FIG. 1 for example, the workpiece should be angularly repositioned to the as-delivered orientation for engagement by chuck 20 followed by transferring and delivery to pallet 8. Of course, workpiece 2 may be unloaded from spindle 30 by any suitable means if further processing and/or delivery is not dependent on a particular angular orientation.

FIGS. 16-23 show another example of the present invention with respect to a bevel ring gear 40 having a plurality of teeth 42 and tooth slots 44. Pallet 8 is configured to include an interior disk 52 and an orientation pin 54 (FIGS. 17, 18) for angularly orientating ring gear 40 on pallet 8. If desired, pallet 8 may include a releasable tooling plate 50 on which the interior disk 52 and orientation pin 54 are attached. Of course, pallet 8 of FIG. 1, for example, may also include a releasable base plate on which, at least, supports 4, 6 and locating element 10 are attached. Means such as a hand-retractable plunger 56 may be included for releasing tooling plate 50 from pallet 8 and locking tooling plate 50 to pallet 8.

Figure 16:
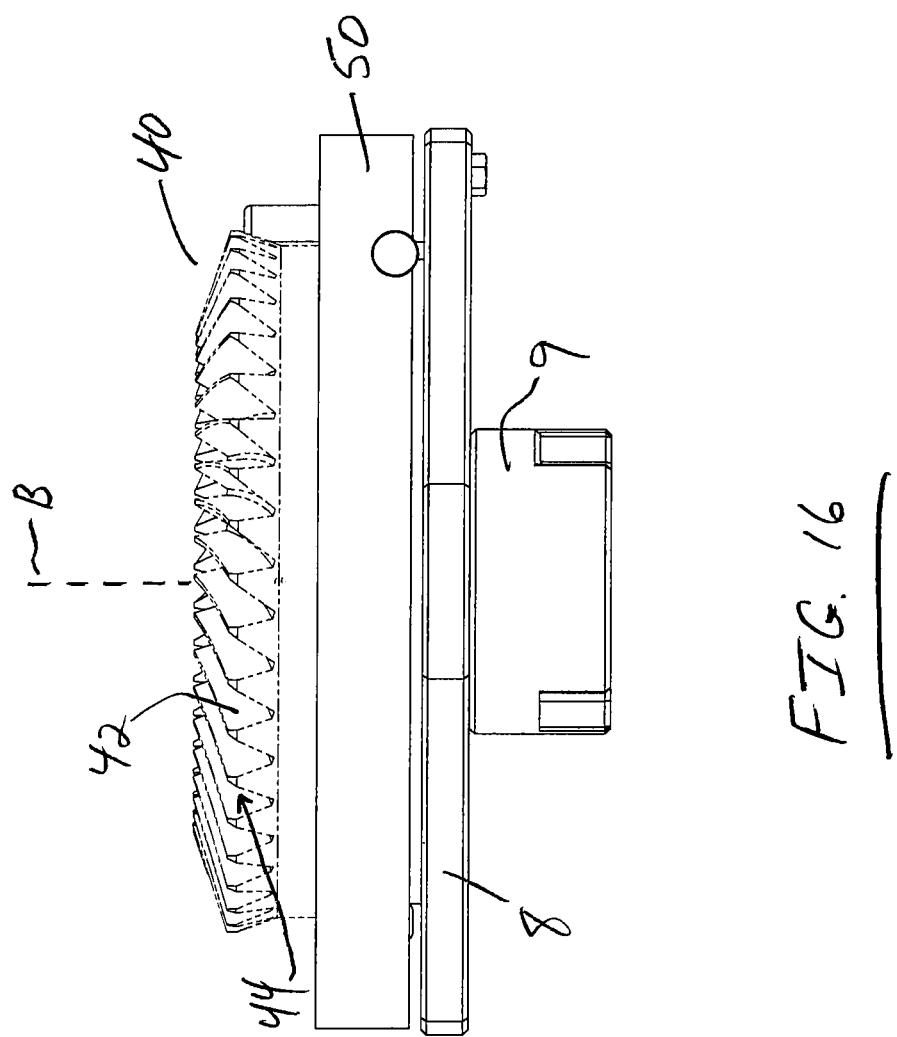
FIG. 16 shows a side view of a bevel ring gear positioned on a pallet of a conveying device.
Figure 17:
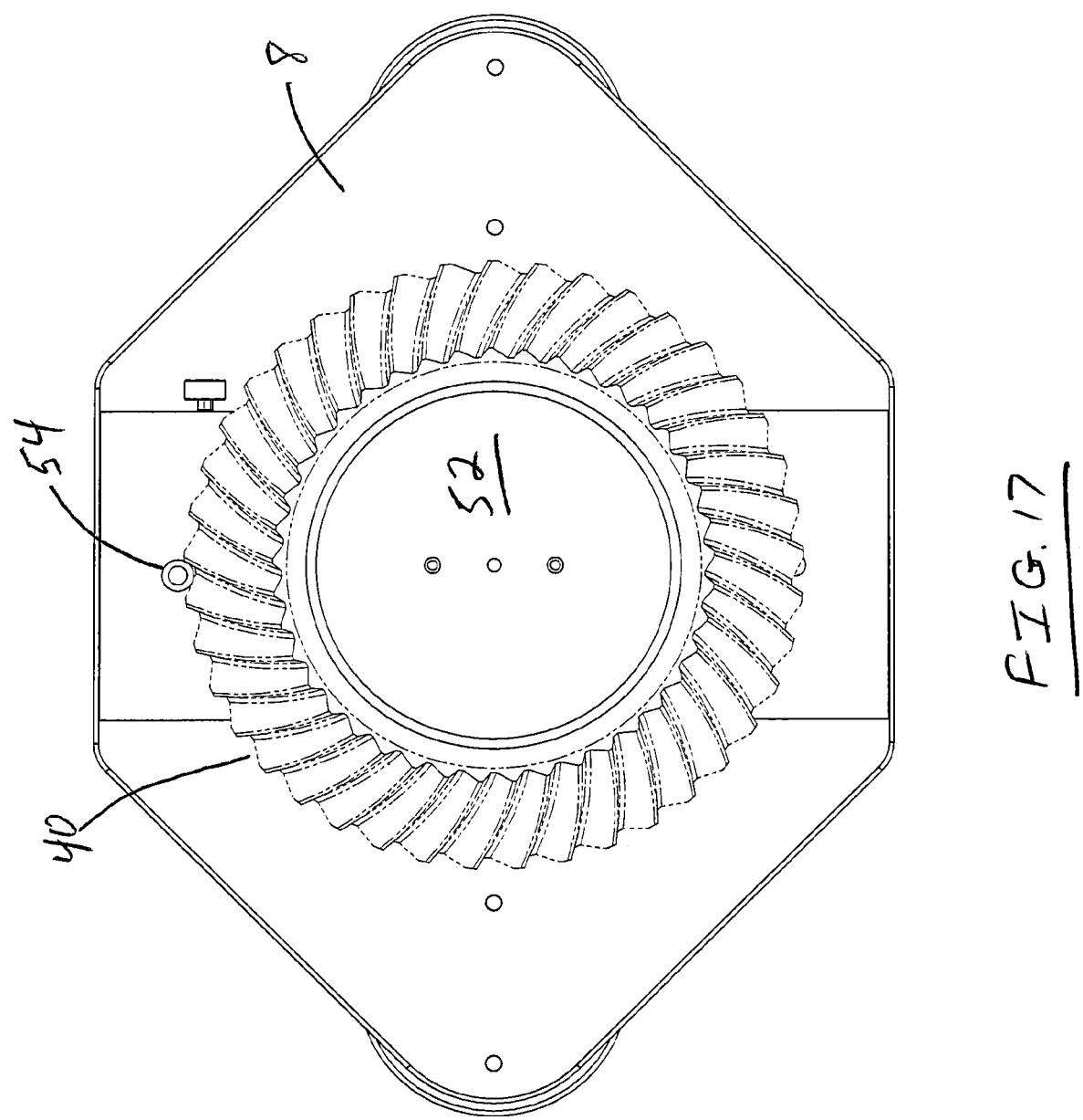
FIG. 17 shows a top view of a bevel ring gear positioned on a pallet of a conveying device.
Figure 18:
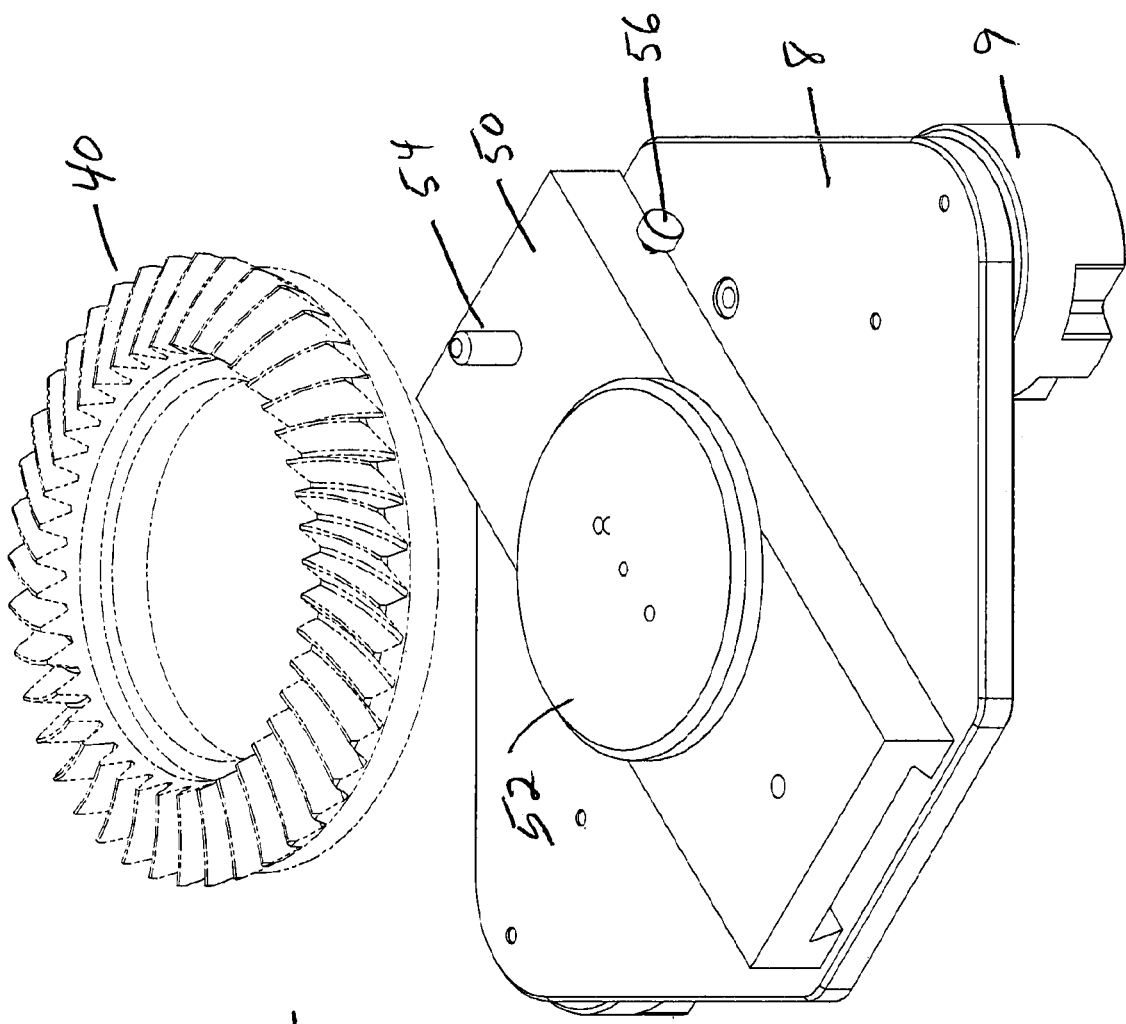
FIG. 18 is an isometric view of a bevel ring gear positioned above a pallet of a conveying device.
Figure 22:
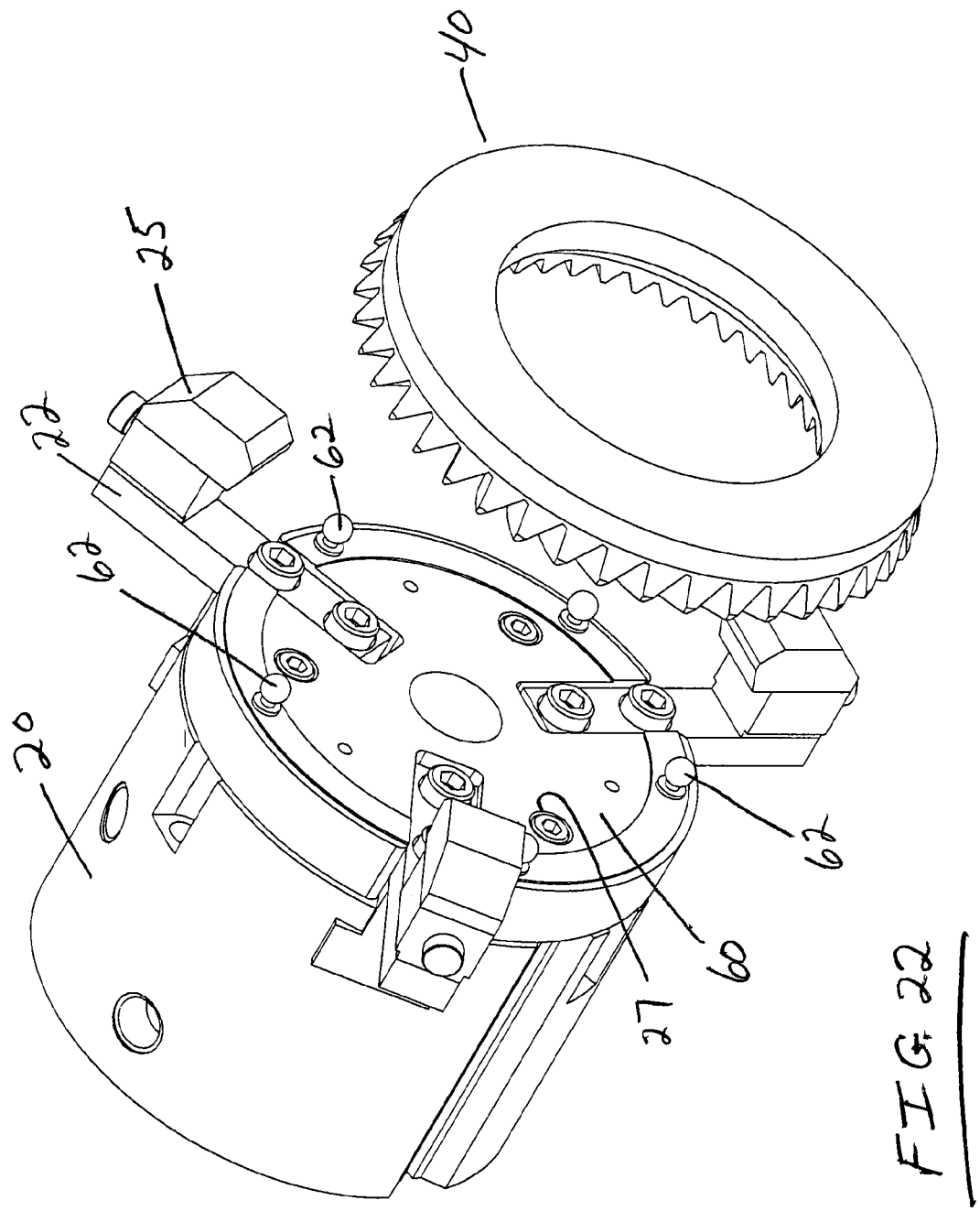
FIG. 22 shows an isometric view of a gripping device aligned for engagement with a bevel ring gear.

FIG. 22 illustrates a chuck 20 aligned with a bevel ring gear workpiece 40 prior to gripping. Preferably, chuck 20 includes a plurality of jaws 22 (e.g. three or four), removable gripper fingers 25 appropriately shaped depending on the configuration of a workpiece, and a plurality of pin and ball elements 62. The pin and ball elements 24 are arranged spaced apart on an adapter plate 60 which is removably attached to the front face 28 of chuck 20 such as by bolts or screws 27. The pin and ball elements 62 are arranged and spaced on adapter plate 60 in a manner so as to coincide with the location of tooth slots 44 on the particular workpiece 40 positioned on pallet 8 (FIG. 16).

Figure 23:
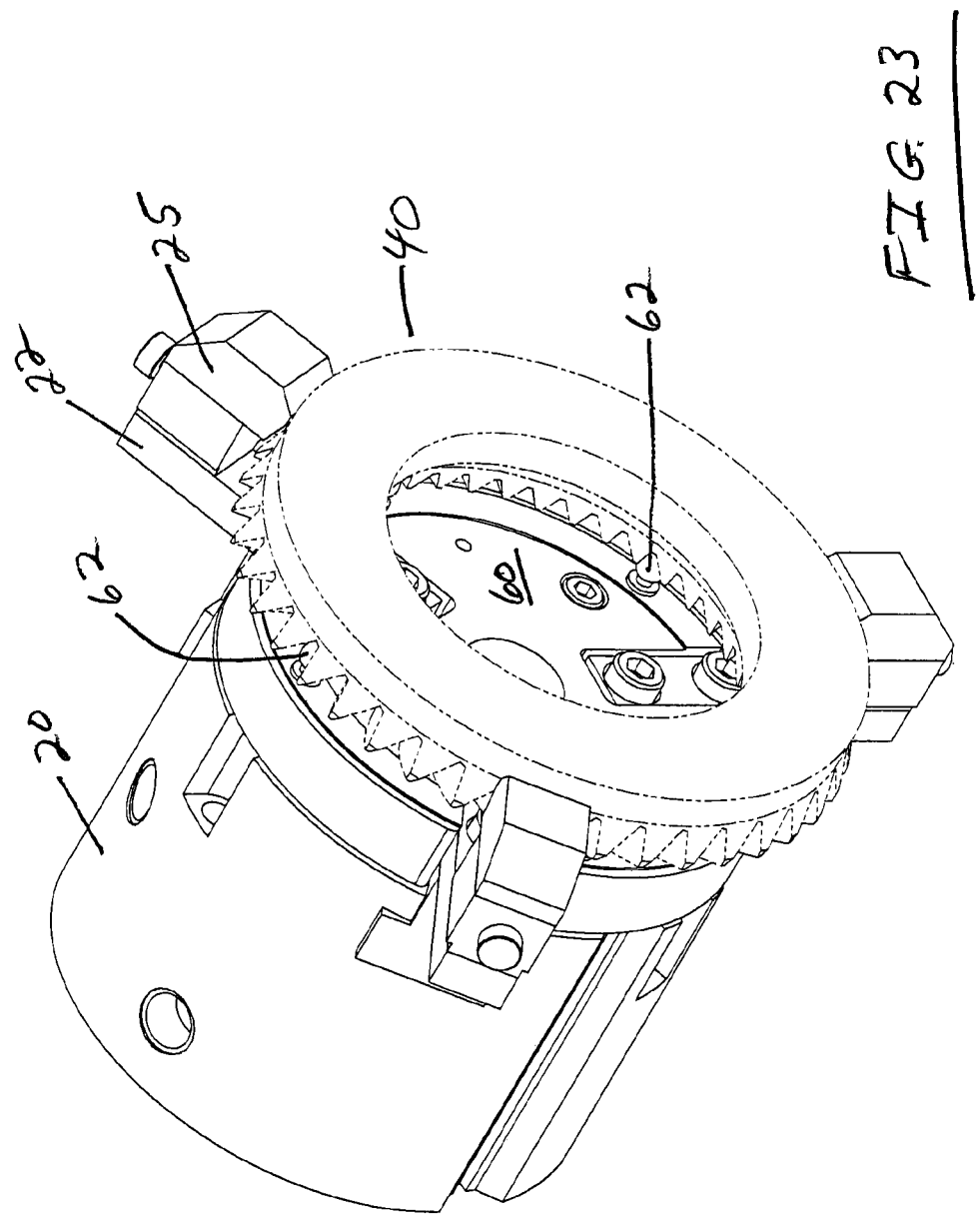
FIG. 23 shows an isometric view of a gripping device engaged with a bevel ring gear.

As previously discussed relative to a bevel pinion, it should be understood that one or both of the chuck 20 and workpiece 40 positioned on pallet 8 (FIG. 16) may need to be moved in one or more directions relative to one another so as to appropriately align the chuck 20 and workpiece 40 for gripping. The appropriate relative movement may be effected by means such as, for example, a robot or along or about one or more machine axes of motion. FIG. 23 shows the chuck 20 engaged with and gripping workpiece 40.

Figure 21:
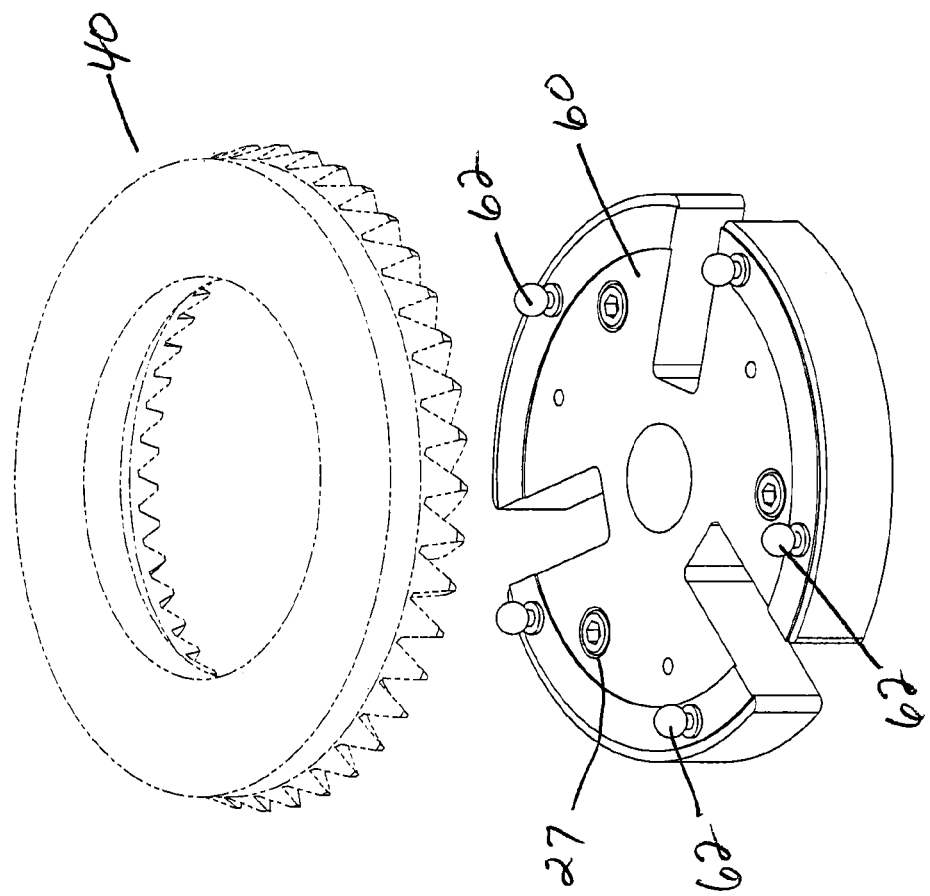
FIG. 21 shows a bevel ring gear positioned above an adapter plate and contacting balls of a gripping device.

Preferably, chuck adapter plate 60 (FIG. 19) includes at least three, more preferably five or more, pin and ball elements 62 (five are shown in FIGS. 20-22). It is also preferred that the pin and ball elements 62 are spaced and positioned whereby during gripping they enter tooth slots 44 spaced about the workpiece in an effort to more evenly distribute the contact between the pin and ball elements 62 and workpiece 40. Although the pin and ball elements 62 are shown as being generally aligned with workpiece axis of rotation B (FIG. 16), the invention is not limited thereto. Pin and ball elements 62 may be oriented as desired based on the particular workpiece and/or gripping mechanism design.

The transfer of workpiece 40 from the pallet 8 to the machine spindle (with suitable work holding equipment such as an arbor) occurs with no discernible angular movement (i.e. rotational movement) of the workpiece whereby the angular (i.e. rotational) position of the teeth of the workpiece as gripped by chuck 20 is the same angular position that is delivered to the machine spindle. Since the first workpiece 40 and all subsequent workpieces of the same design are initially oriented by orientation pin 54 prior to chucking, the same workpiece orientation will be consistently presented to chuck 20. Thus it can be seen that for all workpieces 40 of the same design, each workpiece will be presented to and loaded to the spindle of a processing machine in the same angular orientation. Stated another way, the teeth, and hence, the tooth slots, of each workpiece 40 delivered to and secured by the spindle of a processing machine will be in the same angular position.

By having each bevel ring gear of the same design loaded onto a processing machine in the same angular orientation, the necessity of stock-dividing each workpiece prior to machining is no longer necessary. After the first workpiece is loaded and stock-divided, and the angular adjustment, if any, is determined by the stock-dividing process, the second and subsequent workpieces of the same design can be loaded and angularly adjusted by the same amount as determined by the first workpiece (i.e. initial) stock-dividing operation without the need to conduct stock-dividing for that particular part.

Chuck 20 may be one work holding component of a dual-gripper system wherein dual grippers (e.g. two chucks) are linearly arranged in a back-to-back configuration which may be swiveled about an axis. Such an arrangement, for example, enables unloading of a machined workpiece from a processing machine to a first empty chuck followed by swiveling the chuck mechanism by 180 degrees and loading an unfinished workpiece, previously gripped by the second chuck, to the processing machine. The dual chuck mechanism may be attached to the end of an arm (i.e. end-of-arm tooling or EOAT) of a robot or a linear movable beam. One or both chucks may be fitted with an adapter plate 26 having ball elements 24 such as shown in FIGS. 5-7 for example.

Figure 24:
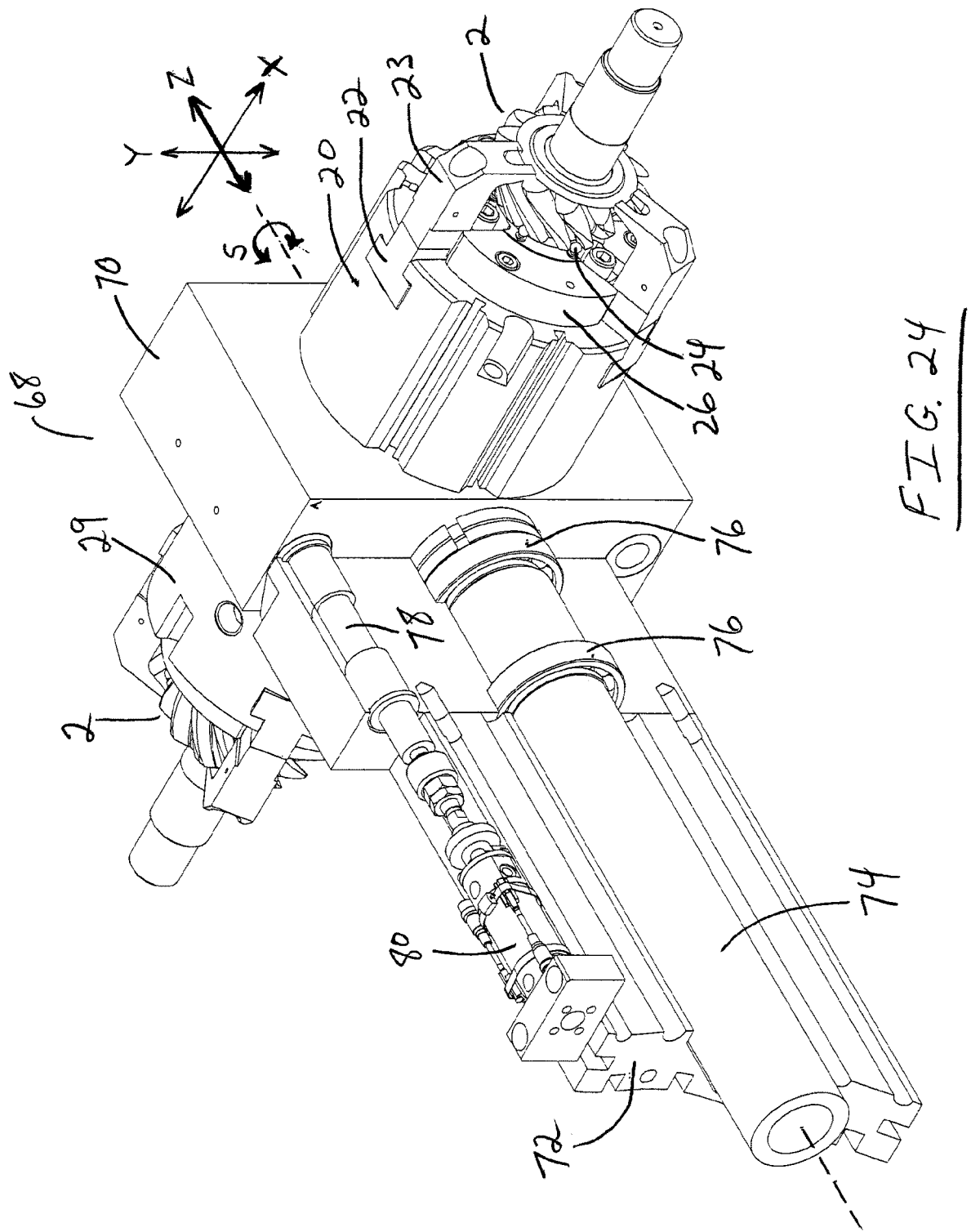
FIG. 24 is an isometric view of a swiveling dual-gripper system.

FIG. 24 shows one example of a swiveling dual-gripper system 68 comprising chucks 20 and 29 wherein chuck 20 includes an adapter plate 26 having ball elements 24 such as shown in FIGS. 5-7 for example. Chuck 29 may have a similar configuration as chuck 20 but may also be configured without ball elements 24 and even without adapter plate 26. The chucks 20, 29 are attached to a head 70 which in turn is rotatably attached to one end of a translatable beam 72 (shown in cut-away view). Beam 72 is capable of linear motion in one or both of perpendicular directions X and/or Z. Head 70 along with chucks 20 and 29 are capable of swiveling (direction S) about axis Z. Swiveling of head 70 is carried out via rotatable shaft 74 and suitable bearings 76. Shaft 74 driven by means such as a belt and pulley (not shown). Chucks 20 and 29 are preferably swiveled by 180 degrees and locked into position, and released therefrom, by a locking pin 78 which may be advanced and withdrawn by a suitable actuating mechanism 80 (e.g. electrical, hydraulic, air, pneumatic, etc.). The dual-gripper system 68 may be part of a stand-alone loading and unloading apparatus of may be part of a flexible automation system.

Preferably, the motion to transfer a workpiece from a pallet 8 to a machine spindle 30, for example, occurs in the same plane such as a horizontal plane defined by directions X and Z of FIG. 24. In this instance, one or both of pallet 8 and/or machine spindle 30 is raised or lowered (e.g. Y direction movement) such that the inward motion of chuck 20 (X direction) relative to a workpiece for removing the workpiece from pallet 8, the path of travel of chuck 20 from pallet 8 to machine spindle 30 (Z direction), and the inward motion of chuck 20 (X direction) relative to machine spindle 30 for loading the workpiece onto a processing machine all occur in the same plane (X-Z plane), preferably a horizontal plane.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of machining rotatable toothed workpieces comprising a plurality of teeth and a plurality of tooth slots, said method comprising:
    (a) loading a first workpiece to a spindle of a workpiece processing machine, said first toothed workpiece having a predetermined design and being in a predetermined rotational load position,
    (b) stock-dividing said first toothed workpiece and determining a machining position for said first workpiece based on said stock-dividing,
    (c) rotationally adjusting said first toothed workpiece by an adjustment amount from said predetermined rotational load position to said machining position,
    (d) machining the teeth of said first toothed workpiece,
    (e) removing said first toothed workpiece from said spindle,
    (f) loading a second toothed workpiece to said spindle of said workpiece processing machine, said second toothed workpiece having said predetermined design and being in said predetermined rotational load position,
    (g) rotationally adjusting said second toothed workpiece by said adjustment amount from said predetermined rotational load position to said machining position,
    (h) machining the teeth of said second toothed workpiece,
    (i) removing said second toothed workpiece from said spindle,
    (j) repeating steps (f)-(i) for any subsequent toothed workpieces having said predetermined design and being in said predetermined rotational load position,
    (k) whereby for said second and subsequent toothed workpieces having said predetermined design, the step of said stock-dividing is not carried out.

2. The method of claim 1 wherein prior to loading said first, second and any subsequent workpieces having said predetermined design, each of the workpieces are transported from a pallet to said workpiece spindle for loading, wherein on said pallet, a workpiece is rotationally positioned in said predetermined rotational load position.

3. The method of claim 2 wherein the pallet comprises a locating element to fix the rotational position of a workpiece in said predetermined rotational load position.

4. The method of claim 3 wherein said locating element comprises a pin and ball arrangement wherein said ball is insertable into a tooth slot of a workpiece.

5. The method of claim 2 wherein for the transporting of a workpiece from the pallet to the workpiece spindle, the workpiece is gripped by a workholding mechanism whereby the rotational position of the workpiece is maintained in said predetermined rotational load position.

6. The method of claim 5 wherein said workholding mechanism comprises a chuck.

7. The method of claim 5 wherein said workholding mechanism comprises a plurality of locating elements to fix the rotational position of a workpiece in said predetermined rotational load position when gripped by said workholding mechanism.

8. The method of claim 7 wherein said locating elements comprise pin and ball arrangements wherein the balls are insertable into respective tooth slots of a workpiece.

9. The method of claim 7 wherein said plurality of locating elements are arranged on and spaced about an adapter plate removably secured to a front face of the workholding mechanism.

10. The method of claim 1 wherein said removing of the first workpiece, the second workpiece and any subsequent workpieces having said predetermined design is carried out with the workpieces being rotationally positioned in said predetermined rotational load position.

11. The method of claim 2 wherein the workpieces are transported via a robot.

12. The method of claim 11 wherein at least one chuck is located on and positionable on said robot.

13. The method of claim 1 wherein said toothed workpieces comprise bevel pinion gears.

14. The method of claim 1 wherein said toothed workpieces comprise bevel ring gears.

15. The method of claim 1 wherein said workpiece processing machine comprises a gear grinding machine.

* * * * *